(12) United States Patent
Kamke

(10) Patent No.: US 9,669,331 B2
(45) Date of Patent: Jun. 6, 2017

(54) FLUID DEGASSING DEVICE AND METHOD FOR DEGASSING FLUIDS

(75) Inventor: Ingo Kamke, Blomberg (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 509 days.

(21) Appl. No.: 13/819,701

(22) PCT Filed: Aug. 29, 2011

(86) PCT No.: PCT/EP2011/064808
§ 371 (c)(1),
(2), (4) Date: May 7, 2013

(87) PCT Pub. No.: WO2012/028573
PCT Pub. Date: Mar. 8, 2012

(65) Prior Publication Data
US 2013/0213232 A1  Aug. 22, 2013

(30) Foreign Application Priority Data

Aug. 30, 2010 (DE) .................. 10 2010 039 959

(51) Int. Cl.
*B01D 19/00* (2006.01)
*B01D 19/02* (2006.01)
*B29B 7/84* (2006.01)
*B29C 47/00* (2006.01)

(52) U.S. Cl.
CPC ......... *B01D 19/02* (2013.01); *B01D 19/0031* (2013.01); *B01D 19/0042* (2013.01); *B29B 7/84* (2013.01); *B29C 47/0009* (2013.01)

(58) Field of Classification Search
CPC . B01D 19/02; B01D 19/0042–19/0057; B01D 19/0031; B01D 19/00–19/0495; B29B 7/84–7/945; B29C 47/0009
USPC .................. 96/155–220; 95/241–266; 55/492
See application file for complete search history.

(56) References Cited

U.S. PATENT DOCUMENTS

| 1,757,690 A | * | 5/1930 | Strindberg | B01D 46/00 126/299 F |
| 3,195,178 A | | 7/1965 | Carton et al. | |
| 3,212,234 A | * | 10/1965 | McMinn | B01D 19/02 55/321 |
| 3,229,449 A | | 1/1966 | Hogue | |
| 3,273,319 A | | 9/1966 | Jones et al. | |
| 3,722,184 A | * | 3/1973 | McMinn | E21B 43/34 196/155 |

(Continued)

FOREIGN PATENT DOCUMENTS

| DE | 100 13 409 C1 | 11/2000 |
| GB | 976637 | 12/1964 |

(Continued)

*Primary Examiner* — T. Bennett McKenzie
(74) *Attorney, Agent, or Firm* — Seed Intellectual Property Law Group LLP

(57) ABSTRACT

The invention concerns a fluid degassing device for degassing fluids, in particular resins. The device has a fluid supply element for supply of the fluid and a fluid discharge element for discharge of the fluid. Between the supply element and the discharge element there is at least one structural element for breaking down bubbles in the fluid as it flows through the structural element. In addition or alternatively there may be provided at least one profile element, over which the fluid must flow.

11 Claims, 4 Drawing Sheets

(56) References Cited

U.S. PATENT DOCUMENTS

| | | | |
|---|---|---|---|
| 3,723,319 A | 3/1973 | McCord et al. | |
| 3,933,448 A * | 1/1976 | Di Peri | B01D 19/0031 96/187 |
| 4,022,593 A * | 5/1977 | Lerner | B01D 53/18 55/424 |
| 4,448,537 A | 5/1984 | Sugimori et al. | |
| 4,560,461 A * | 12/1985 | Okazaki | C25B 9/08 204/252 |
| 4,716,024 A * | 12/1987 | Pera | 422/186.01 |
| 4,734,269 A | 3/1988 | Clarke et al. | |
| 5,039,430 A * | 8/1991 | Corey, Jr. | 210/806 |
| 5,695,545 A | 12/1997 | Cho et al. | |
| 5,875,899 A * | 3/1999 | Nishiyama | B01D 19/0031 209/156 |
| 6,048,376 A * | 4/2000 | Miller | B01D 50/002 55/320 |
| 6,258,154 B1 | 7/2001 | Berndt et al. | |
| 6,267,926 B1 * | 7/2001 | Reed | A61M 1/1698 210/314 |
| 6,485,607 B1 | 11/2002 | Elsner et al. | |
| 2007/0163438 A1 * | 7/2007 | Chiappetta et al. | 96/6 |

FOREIGN PATENT DOCUMENTS

| | | |
|---|---|---|
| GB | 1 401 382 A | 7/1975 |
| JP | 42-4187 | 2/1967 |
| JP | 57-25711 U | 2/1982 |
| JP | 62-5356 A | 1/1987 |
| JP | 4-313301 A | 11/1992 |
| JP | 4-313307 A | 11/1992 |
| JP | 7-328315 A | 12/1995 |
| JP | 10-113504 A | 5/1998 |
| JP | 2002-512282 A | 4/2002 |
| JP | 2002-283344 A | 10/2002 |
| JP | 2006-27102 A | 2/2006 |
| RU | 2 069 072 C1 | 11/1996 |
| RU | 57627 U1 | 4/2006 |
| SU | 1304845 A1 | 4/1987 |
| SU | 1205361 A | 10/1990 |
| WO | 03/064144 A1 | 8/2003 |

* cited by examiner

Detail F

Detail E

FLUID DEGASSING DEVICE AND METHOD FOR DEGASSING FLUIDS

TECHNICAL FIELD

The present invention concerns a device for and a method of degassing fluids.

DESCRIPTION OF THE RELATED ART

Synthetic resins are used in the production of composite fiber components. In that respect it is important for the resin to be as free as possible of air inclusions or bubbles as such air inclusions have the effect on the material of weakening the structure.

Thus degassing of the resin therefore has to be effected. Typically, the resin is introduced into stirring containers and stirred under vacuum. In that case, material degassing generally takes place only in the region near the surface.

A further variant for resin degassing is represented by the so-called thin-layer degassing operation. As already stated hereinbefore degassing happens in particular at the surface while the high viscosity of the resin allows the gas bubbles to rise out of the depth to the surface slowly and therefore degassing is difficult. That necessitates long residence times.

As an alternative thereto it is also possible to use semi-permeable films to permit resin degassing.

As general state of the art attention is directed to WO 2003/064 144 A1 and U.S. Pat. No. 3,229,449 A.

BRIEF SUMMARY

In one embodiment, there is provided a fluid degassing device for degassing fluids, such as resins. The device has a fluid supply element for supply of the fluid and a fluid discharge element for discharge of the fluid. Between the supply element and the discharge element there is at least one structural element for breaking down bubbles in the fluid as it flows through the structural element. In addition or alternatively there may be provided at least one profile element, over which the fluid must flow. The fluid degassing device further has a first chamber into which the fluid is fed by the fluid supply element. The first chamber has at least one first structural element in the form of a non-woven material. The device further has a second chamber which adjoins the first chamber. The second chamber has a second structural element which is in the form of a mesh and by way of which the fluid is passed.

In a further aspect there is a separating wall between the first and second chambers. The separating wall has at least one gap.

In a further aspect of the invention the device has a third chamber which adjoins the second chamber and which has at least one convex element.

In a further aspect of the invention there is a separating wall between the first and second chambers and it has at least one gap.

In a further aspect of the invention the device has a pivot axis for pivoting the device.

In a further aspect of the invention the device has a mesh element which is arranged around the fluid discharge element.

The invention also concerns a method of degassing fluids, such as resins. For that purpose a fluid is supplied, bubbles in the fluid are broken down by passing the fluid through at least one structural element and/or the fluid is passed over at least one profile element. The fluid can then be discharged.

The invention also concerns a wind power installation rotor blade produced by a resin which has been degassed by the fluid degassing device.

BRIEF DESCRIPTION OF THE SEVERAL VIEWS OF THE DRAWINGS

The invention is described in greater detail hereinafter by embodiments by way of example and with reference to the drawings.

DETAILED DESCRIPTION

Figure 1:
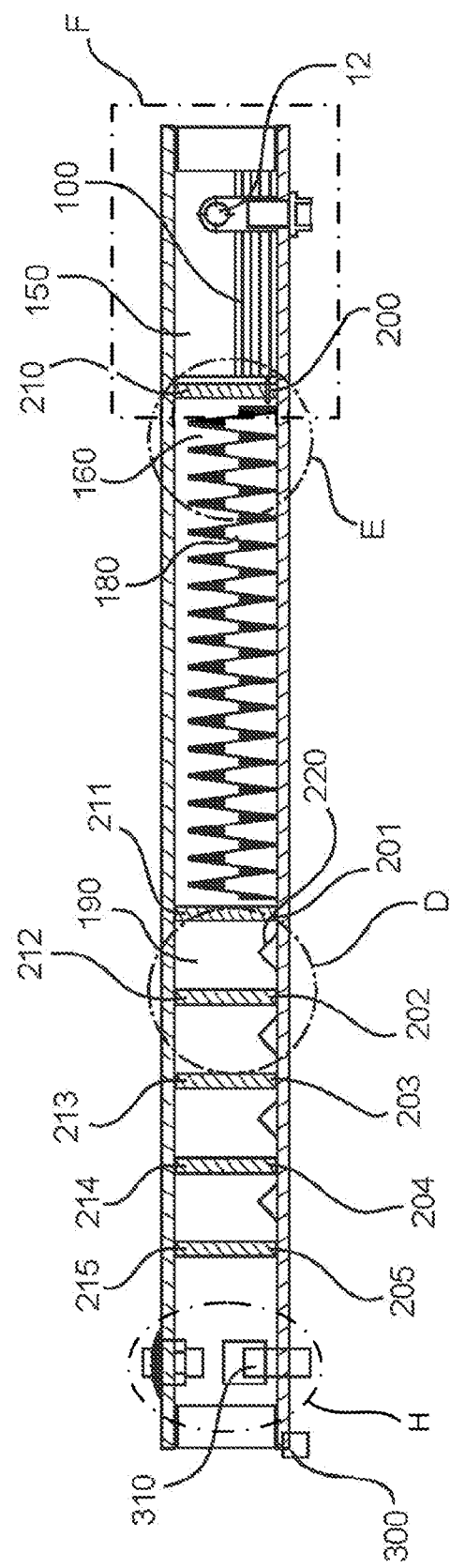
FIG. 1 shows a diagrammatic sectional view of a resin degassing device, according to an embodiment of the invention.

FIG. 1 shows a diagrammatic sectional view of a resin degassing device according to a first embodiment. This device serves for degassing and in that respect can be provided with a pivot mounting 300, by way of which the degassing device can be adjusted. The flow rate of the resin can be adjusted by the degree of inclination. In that case the inclination of the device can be set at between 1 and 10% and determines the resin layer thickness and the residence time in the vacuum and thus ultimately the degassing quality.

The resin to be degassed is introduced into a first chamber 150 through a connection 12. The resin then flows through a second chamber 160 into a third chamber 190 in order then to flow out by way of a flow discharge 310. In the first chamber 150 the resin flows out of the supply connection 12 through a non-woven material 100 to the bottom of the first chamber 150 in order to flow through a first gap 200 or an opening in a first wall 210 between the first and second chambers 150, 160 into the second chamber 160. A plurality of grills or meshes 180 are located in the second chamber. The resin must flow through the meshes 180 so that bubbles in the resin can be removed. The resin flows into the third chamber 190 through a second gap or opening 201 in a second wall 211 between the second and third chambers 160, 190. Provided in the third chamber 190 are a plurality of profile members 220, over which the resin flows. Thus the region of the resin, that is near the surface, is enlarged in size in the third chamber, which has a positive effect in degassing. Provided at the end of the third chamber 190 is a flow discharge 310, by way of which the degassed resin can flow away again.

Figure 2:
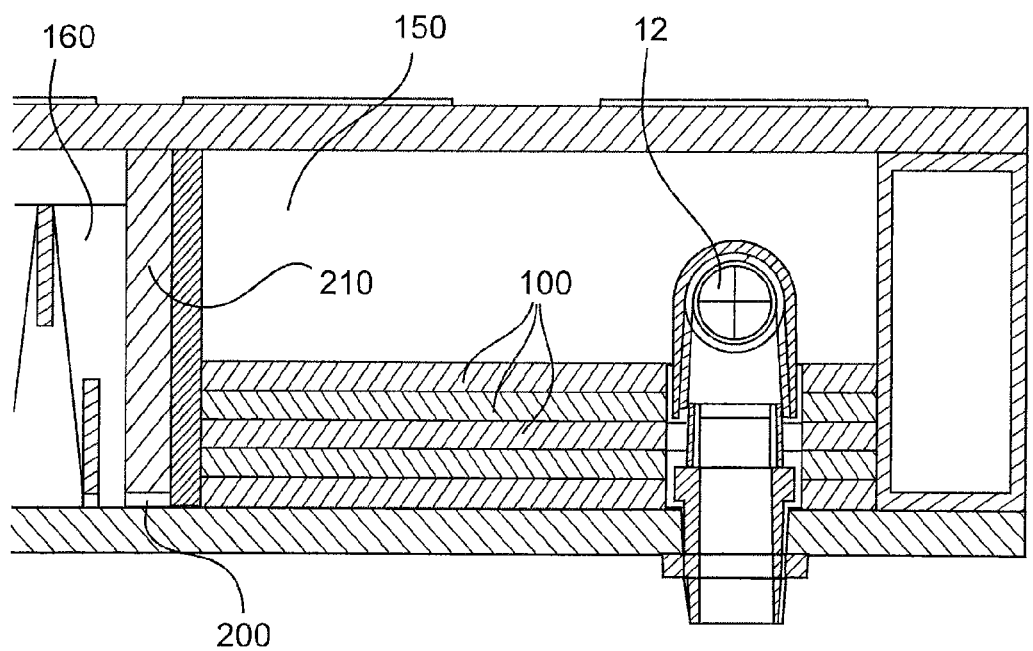
FIG. 2 shows a diagrammatic sectional view of a first end of a degassing device of FIG. 1.

FIG. 2 shows a diagrammatic sectional view of a first end (detail F) of the degassing device of FIG. 1. The resin is introduced into the container, that is to say into the first chamber 150, through a supply connection 12. Provided beneath the supply connection 12 is at least one layer of non-woven material 100. In that case the non-woven material 100 should be of such a configuration that the resin can flow slowly therethrough. Thus, the first bubbles can already be removed from the resin by the structure of the non-woven material. The resin thus flows through the non-woven material 100 and through a first gap or opening 200 in the first wall 210 from the first chamber 150 into the second chamber 160.

Figure 3:
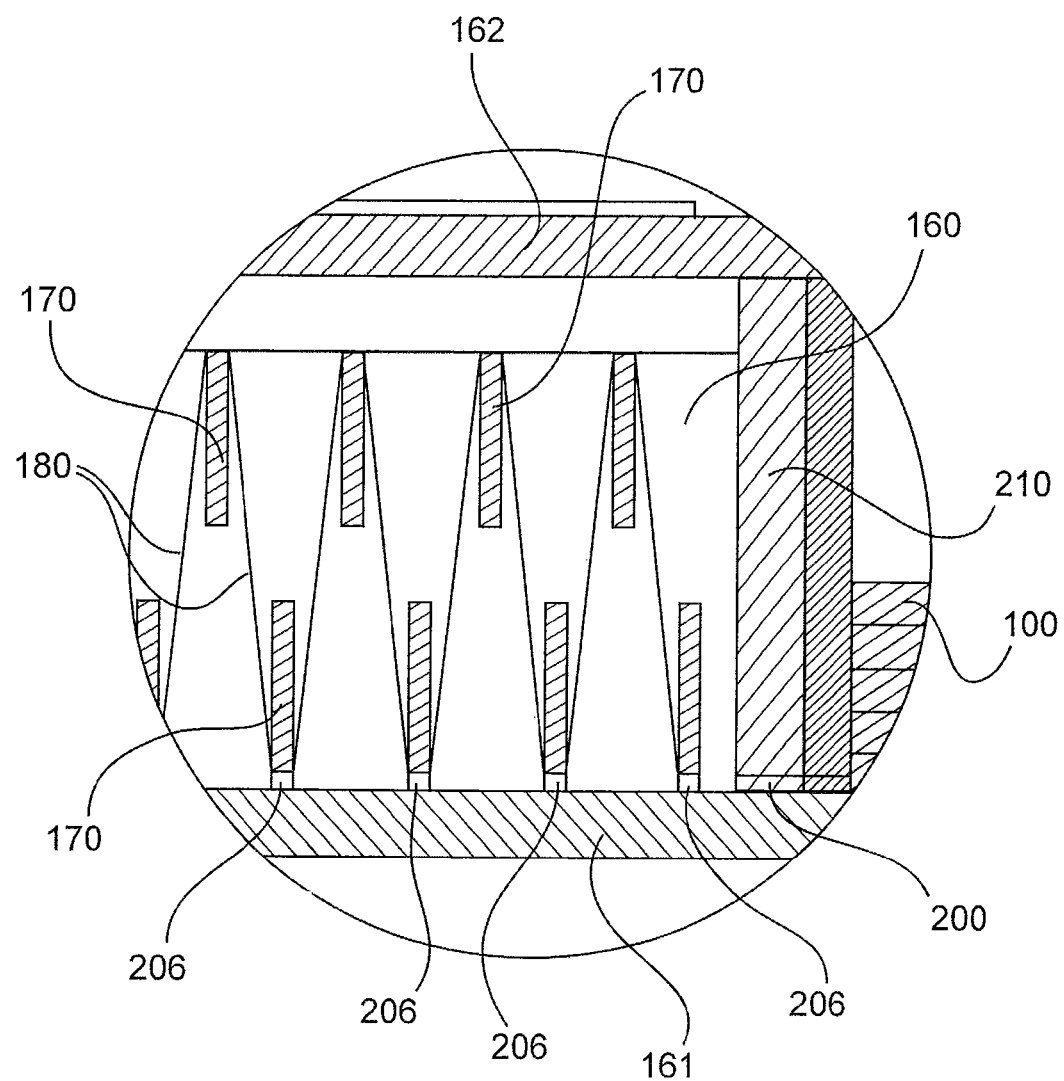
FIG. 3 shows a diagrammatic sectional view of a transition between a first and a second chamber of the degassing device of FIG. 1.

FIG. 3 shows a detailed view of the detail E in FIG. 1, that is to say the transition between the first and second chambers 150, 160 in FIG. 1. The container includes container portions 161 and 162. Arranged in the second chamber 160 are a plurality of transverse struts 170 respectively disposed at the top and the bottom of the chamber 160. Meshes 180 are stretched between the respective transverse struts 170 which have for example a mesh width of some millimeters. The resin flowing through the first opening 200 in the first wall 210 into the second chamber must overcome the first transverse strut 170 at the bottom of the chamber and thus flows over that transverse strut 170 so that, in flowing down from the transverse strut 170, the resin must flow through the mesh 180. In addition the transverse struts 170 can optionally have gaps 206 at the bottom of the second chamber 160. Accordingly, the provision of the transverse struts 170 provides that the resin flows upwardly at the transverse struts 170 so that the surface area of the resin is increased in size, which results in improved degassing. In addition, when flowing down from the transverse struts 170, the resin must flow through the meshes 180 which cause further degassing of the resin.

In that case the first gap 200 can be relatively thin in order to achieve a relatively thin resin layer flowing therethrough so that the bubbles are moved into the region near the surface. The viscosity or flow rate can be adjusted by adjusting the temperature. The meshes 180 can also be of a multi-layer nature. The mesh structure in that case can be made of plastic fiber or metal, as long as it is ensured that the mesh is not dissolvingly attacked or dissolved by the resin. Thus the mesh structure represents a parameter in respect of resin degassing. In some embodiments, the transverse struts 170 may not terminate directly with the bottom of the left-hand chamber 160, but rather there can also be gaps between the transverse struts and the bottom of the left-hand chamber 160 so that the through-put rate in resin degassing can be increased.

Figure 4:
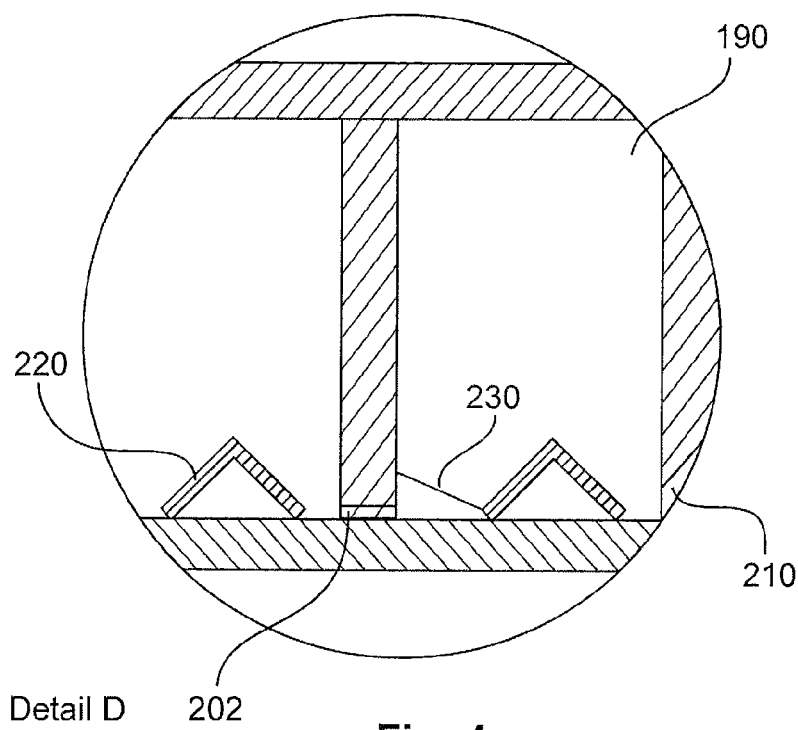
FIG. 4 shows a diagrammatic sectional view of a further transition between the second chamber and the third chamber in the degassing device of FIG. 1.

FIG. 4 shows a detail D of FIG. 1, that is to say a transition between the second chamber 160 and a third chamber 190 which adjoins the second chamber at the left. The second separating wall 211 between the second chamber 160 and the third chamber 190 again has a second gap 201 at its lower side. Thus the resin is again forced to flow through that thin second gap 201, whereby the surface area or the region near the surface is further increased in size.

Profile members 220 are arranged in the third chamber 190 in such a way that the resin has to flow over the profile members so that this gives a further increase in the surface area or the region near the surface of the resin. Advantageously the profile members 220 are arranged upside down so that the resin can flow thereover. The profile members can be of a convex configuration. The third chamber 190 can be divided by a plurality of separating walls 212-215 each having a respective gap 202-205. At least one profile member 220 is arranged in each of the divided chambers. The fact that the gaps 202-205 between the chambers or portions in the further chambers 190 are only very narrow means that only a small amount of resin flows through the gap 202-205 so that resin can accumulate in front of the gap, that is to say a resin accumulation 230 occurs. Because only a thin resin film flows over the edges of the profile members 220 the region near the surface is increased in size, which has a positive effect in terms of degassing.

Figure 5:
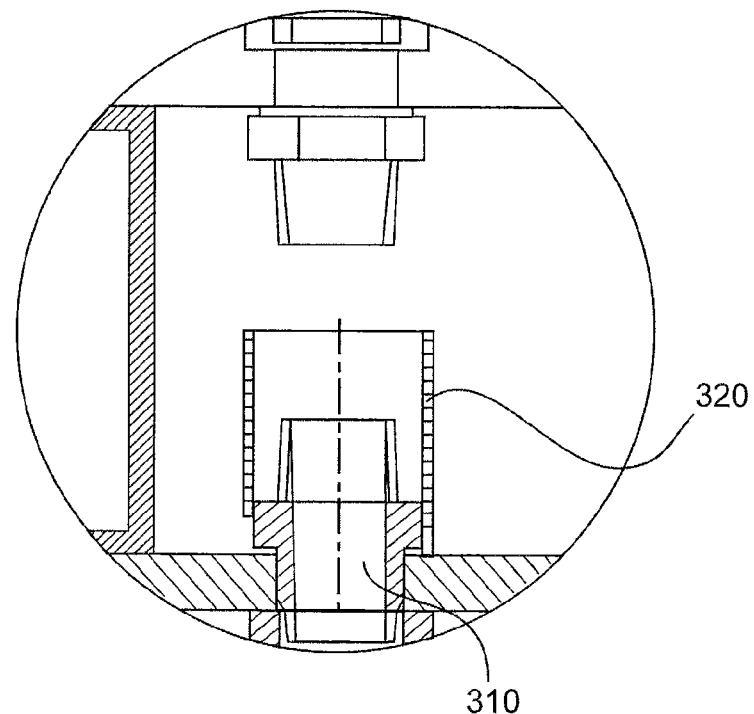
FIG. 5 shows a diagrammatic sectional view of a detailed portion of an end of the third chamber of the degassing device of FIG. 1.

FIG. 5 shows a detail H in FIG. 1, that is to say a left-hand portion of the left-hand end of the third chamber 190. Shown here is a flow discharge connection 310 which is not disposed down in the bottom but is placed upwardly in such a way that only the uppermost layer of the resin is skimmed off. In addition there can be still a further mesh 320 to remove further bubbles from the resin.

Degassing of markedly more than 90% of the resin can be achieved with such a device. The entire device is operated under vacuum. The pressure in that respect is about 10 mbar.

The resin which has been degassed by the above-described fluid degassing device can be used for the manufacture of a wind power installation rotor blade. Alternatively to that the resin which has been degassed by the fluid degassing device can also be used for the manufacture of other components of a wind power installation.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fluid degassing device comprising:
    a supply conduit configured to receive resin;
    a discharge conduit configured to discharge the resin; and
    degassing chambers configured to remove gas in the resin as the resin passes from the supply conduit to the discharge conduit, the degassing chambers including:
        a first chamber configured to receive the resin from the supply conduit, the first chamber including at least one first structural element that includes a non-woven material configured to remove at least some gas from the resin as the resin passes through the non-woven material;
        a second chamber configured to receive resin from the first chamber, the second chamber including at least one second structural element that includes a mesh through which the resin is passed, the mesh being configured to remove at least some gas from the resin; and
        a third chamber in fluid communication with the second chamber and configured to receive resin from the second chamber, the third chamber comprising a wall, a first gap below the wall, and a plurality of convex-shaped elements, wherein the resin flows through the first gap and accumulates in front of a first one of the plurality of convex-shaped elements until the resin flows over an upper edge of the first one of the plurality of convex-shaped elements so that a surface area of the resin increases in size thereby removing gas from the resin.

2. The device according to claim 1 further comprising a separating wall between the first and second chambers that includes at least one second gap.

3. The device according to claim 1 further comprising a separating wall between the second and third chambers that includes at least one third gap.

4. The device according to claim 1 further comprising a pivot axis for pivoting the device.

5. The device according to claim 1 further comprising a mesh element arranged around the discharge element.

6. The fluid degassing device according to claim 3, wherein the second chamber includes a plurality of struts that extend toward a center portion of the second chamber, the mesh being stretched between the plurality of struts so that the resin flows through the mesh between the plurality of struts.

7. A fluid degassing device comprising:
  a supply conduit that receives resin;
  a structural member that receives the resin from the supply conduit, the structural member including:
    a first chamber that includes non-woven material that removes at least some gas from the resin as the resin passes therethrough,
    a second chamber in fluid communication with the first chamber, the second chamber including a mesh that removes at least some gas from the resin as fluid flows through the mesh, and
    a third chamber in fluid communication with the second chamber and configured to receive resin from the second chamber, the third chamber including a wall, a first gap below the wall, and a plurality of convex-shaped elements, wherein the resin flows through the first gap and accumulates in front of a first one of the plurality of convex-shaped elements until the resin flows over an upper edge of the first one of the plurality of convex-shaped elements so that a surface area of the resin increases in size thereby removing gas from the resin; and
  a discharge conduit that receives the resin from the third chamber of the structural member and discharges the resin.

8. The fluid degassing device according to claim 7, wherein the first chamber is in fluid communication with the second chamber by a second gap that causes the resin to become thinner as the resin flows from the first chamber to the second chamber.

9. The fluid degassing device according to claim 7, wherein the second chamber is in fluid communication with the third chamber by a third gap that causes the resin to become thinner as the resin flows from the second chamber to the third chamber.

10. The fluid degassing device according to claim 7, wherein the third chamber includes a plurality of separating walls to form divided chambers, each divided chamber including one of the plurality of convex-shaped elements, the resin flowing through each of the divided chambers and over the respective plurality of convex-shaped elements.

11. The fluid degassing device according to claim 7, wherein the second chamber includes a plurality of struts that extend toward a center portion of the second chamber, the mesh being stretched between the plurality of struts so that the resin flows through the mesh between the plurality of struts.

\* \* \* \* \*